United States Patent [19]

Saito et al.

[11] 4,261,393
[45] Apr. 14, 1981

[54] TIRE CORD FABRIC SUITABLE FOR REINFORCEMENT OF RUBBER ARTICLES

[75] Inventors: Shigeru Saito, Higashiyamato; Hiroshi Inoue, Kodaira, both of Japan

[73] Assignee: Bridgestone Tire Co., Ltd., Tokyo, Japan

[21] Appl. No.: 936,657

[22] Filed: Aug. 25, 1978

[30] Foreign Application Priority Data

Aug. 30, 1977 [JP] Japan .................. 52-103266

[51] Int. Cl.³ .............................................. D03D 1/00
[52] U.S. Cl. .............................. 139/384 R; 152/358; 139/408
[58] Field of Search ........... 139/383 R, 384 R, 387 R, 139/408, 420 R, 426 R, DIG. 1; 152/358

[56] References Cited

U.S. PATENT DOCUMENTS

| | | | |
|---|---|---|---|
| 977,357 | 11/1910 | Zeglen | 152/358 |
| 1,077,128 | 10/1913 | Doughty | 139/384 R |
| 1,252,703 | 1/1918 | Kline | 152/358 |
| 1,324,864 | 12/1919 | Wehner | 139/383 R |
| 1,335,311 | 3/1920 | Zeglen | 139/384 R |
| 2,672,168 | 3/1954 | Walters | 139/383 R |
| 2,688,895 | 9/1954 | Houghton | 139/384 R |

*Primary Examiner*—Henry Jaudon
*Attorney, Agent, or Firm*—Sughrue, Rothwell, Mion, Zinn and Macpeak

[57] ABSTRACT

A tire cord fabric suitable for reinforcement of rubber articles is disclosed. The tire cord fabric is manufactured by lengthwisely arranging a great number of cords as warp cords over a given width and then relatively coarsely interlacing them with weft yarns. In each selvage portion of the fabric is formed a joint part consisting of a special cord arrangement.

3 Claims, 6 Drawing Figures

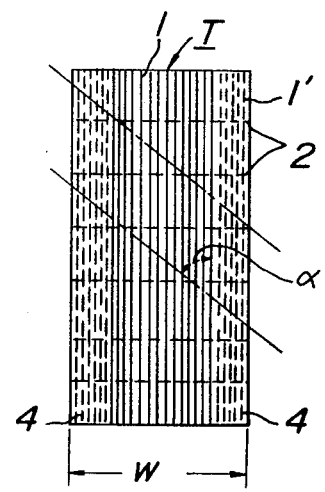
FIG_2
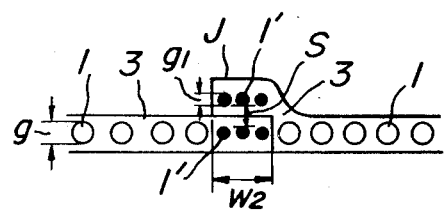
FIG_2a
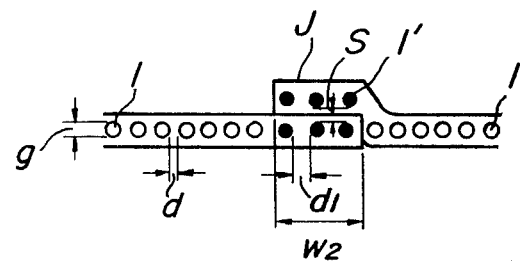
FIG_2b

TIRE CORD FABRIC SUITABLE FOR REINFORCEMENT OF RUBBER ARTICLES

The present invention relates to tire cord fabrics suitable for reinforcement of rubber articles and more particularly, it relates to an improvement of both selvage portions in the tire cord fabric influencing performance of tire when it is used as a reinforcing member for rubber tires.

In general, tire cord fabrics of this type are widely used as the reinforcing member for tires, belts and other rubber articles. In the application of tire reinforcement, the cord fabric is particularly composed of thick cords, each having a structure of more than 400 deniers/2, preferably about 1890 d/2, as warp cords and common spun yarns as weft yarns wherein the warp density or end is not less than 20 cords per 5 cm, preferably about 50 cords per 5 cm over a width of fabric of about 1.5 m and the weft density is not more than 15 yarns per 5 m in a lengthwise direction. The overall length of the tire cord fabric is usually about 2,000 to 3,000 m. For the warp cord, frequently used are fiber cords, metal cords such as steel cords and the like.

In FIG. 1 is shown an embodiment of the conventional tire cord fabric T. This fabric T is manufactured by interlacing warp cords 1 with weft yarns 2 at a given width W, subjecting the resulting woven fabric to an adhesive treatment and a heat treatment under a certain condition so as to stabilize its properties and then coating it with an unvulcanized coating rubber. Next, the fabric T is cut at an angle $\alpha$ inclined with respect to the warp line with a given width B by means of a suitable machine such as a bias cutter to produce cut pieces C, which are successively joined to each other by overlapping a selvage portion of one cut piece with a corresponding selvage portion of another cut piece as shown in FIG. 1a. Hence an intermediate material usable for the tire reinforcement is prepared in a form of a successive jointed piece.

FIG. 1b shows a cross section of the intermediate material including a joint part J taken along line Z—Z of FIG. 1a. In the joint part J, two cut pieces C are joined to each other at a constant overlap distance $w_1$ by the tackiness of the unvulcanized coating rubber.

Recently, labor-saving and mechanization have been advanced in the tire industry. In this connection, automation of the above mentioned cut piece joint has been examined and as a result, some means have been put to practical use. Apart from this, it is necessary to reduce the number of plies in the tire construction by increasing the thickness of tire cord to be used in view of tire performances, especially soft riding and heat building. For this reason, a recent tendency of increasing the number of denier is unavoidable.

However, there are caused the following problems in the joint part J at the step of manufacturing the aforementioned intermediate material in connection with the increase of denier number. That is, as the cord diameter g of the warp cord 1 becomes large, the difference of thickness between the cut piece C and the joint part J is considerably large. Therefore, inconveniences occur in the step of winding the intermediate material. Especially, the joint part J is strongly compressed in a course of tire molding and vulcanization, particularly at a step of subjecting a green tire to a stitching after the intermediate material is assembled with other tire-forming materials. As a result, a space S between the upper and lower warp cords 1, 1 in the joint part J is made considerably small by the fluidizing of the coating rubber 3 and in some occasions the upper and lower warp cords 1, 1 fall one upon another and strongly come into direct contact with each other. Consequently, the above thickness difference is liable to produce a nucleus causing interlaminar separation during the running, which seriously degrades the tire performance, particularly durability.

Further, when the intermediate material is used as a carcass ply, if the ply number is small, the joint part J affects tire uniformity (i.e. runout or force variation) and the like. Moreover, excessive cord number in the joint part J is apparently disadvantageous in the cost.

In the manufacture of the intermediate material by manual labor, the cut pieces C can be, of course, joined to each other only by abutting one selvage portion of the cut piece C on the corresponding selvage portion of another cut piece C. However, when such a joint operation is conducted by mechanical working, it is necessary to overlap one selvage portion of the cut piece C with the corresponding selvage portion of another cut piece C at an overlap distance $w_1$ in the joint part J.

It is, therefore, an object of the present invention to provide a tire cord fabric suitable for reinforcement of rubber articles which is adapted for automatic jointing of cut pieces in the manufacture of the intermediate material not having a bad influence on the performance of the rubber article.

The inventors have made various studies with respect to the warp cord 1 in the joint part J or the overlapped portion indispensable for automating of the joint operation. As a result, it has been found that the object can be achieved by taking the cord diameter or the space between the adjoining cords in both selvage portions of the tire cord fabric into consideration.

Namely, the present invention provides a tire cord fabric for reinforcement of rubber articles wherein a great number of cords are lengthwisely arranged as warp cords over a given width and then coated with an unvulcanized rubber. It is characterized by providing a special means on the cord arrangement in the selvage portion of the fabric.

The present invention will now be described in greater detail with reference to the accompanying drawings, wherein:

FIG. 1b is a cross sectional view of a joint part taken along line Z—Z of FIG. 1a;

FIG. 2 is a schematic illustration of an embodiment of the tire cord fabric according to the present invention; and FIGS. 2a and 2b are cross sectional views of embodiments of the joint part according to the present invention, respectively.

Figure 1:
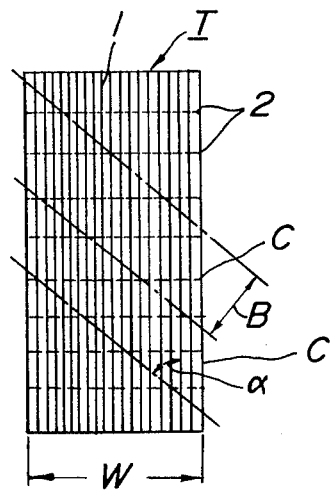
FIG. 1 is a schematic illustration of an embodiment of the conventional tire cord fabric as mentioned above.
Figure 1A:
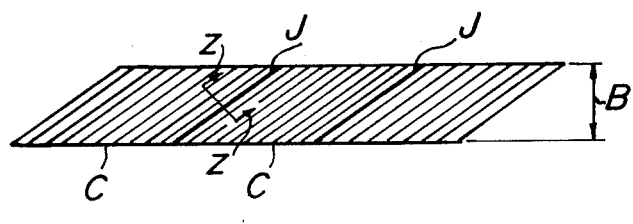
FIG. 1a is a schematic illustration of an intermediate material obtained by jointing cut pieces of the fabric shown in FIG. 1.
Figure 1B:
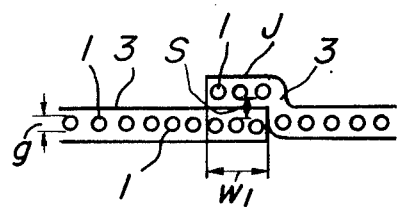

In FIG. 2 is shown a plan view of an embodiment of a tire cord fabric T used as a reinforcing member for tires according to the present invention and in FIGS. 2a and 2b are shown partly enlarged cross sectional views of embodiments of a joint part J produced by jointing cut pieces of the fabric T to each other.

First, the inventors have made various studies with respect to cord arrangement in both selvage portions 4, 4 and the remaining central portion of the fabric T provided that each selvage portion 4 corresponds to the overlap distance $w_2$ of the joint part J. As a result, it has been found out that a good result is obtained by making a cord diameter $g_1$ of warp cords 1' in the both selvage portions 4, 4, of the fabric T smaller than the cord diameter g of the warp cords 1 in the remaining central portion. The cord diameter $g_1$ should be within a range of 40–80%, preferably 45–70% with respect to the cord diameter g, or alternatively by making a space $d_1$ between the adjoining cords in the selvage portion larger than a space d between the cords in the remaining central portion and equal at least to the cord diameter g.

When the cord diameter $g_1$ of the warp cord 1' in the selvage portion is less than 40% with respect to the cord diameter g of the warp cord 1 in the remaining central portion, the strength of the cord in the joint part J is deficient and also there is caused trouble in the manufacture of the tire cord fabric T. However, when the cord diameter $g_1$ exceeds 80%, there is caused the same problem as in the prior art.

The selvage portion 4 of the tire cord fabric T, i.e. the width corresponding to the overlap distance $w_2$ in the joint part J is determined by the accuracy of automatic jointing, taking-off at subsequent step and the like, but it is usually 3–10 mm, preferably about 5 mm.

Moreover, it is preferable to select the cord diameter and number of the warp cord 1' so that the strength of the joint part J is substantially equal to that of the remaining central portion. As a result of overlapping, the selvage portions with each other at the overlap distance $w_2$.

Furthermore, the material of the warp cord 1' is desired to be the same as in the warp cord 1 because the properties of the warp cords 1, 1' become very important in the tire cord fabric as a finished product.

As shown in FIG. 2b, when the warp cords 1' in the selvage portion 4 of the tire cord fabric T are arranged at a space $d_1$ corresponding to the cord diameter g and larger than a space d in the remaining central portion over the overlap distance $w_2$ and the cord diameter of the warp cord 1' in the selvage portion is equal to the cord diameter g of the warp cord 1. If it is intended to use the resulting tire cord fabric as a reinforcing member for tire, the problem of falling the upper and lower warp cords 1', 1' one upon another as mentioned above does not occur because the warp cords 1' in the joint part J are forcedly pushed in the upper and lower spaces $d_1$ between the adjoining warp cords 1' in the vulcanization step of tire.

The following examples are given in illustration of the invention and are not intended as limitations thereof.

EXAMPLE 1

In accordance with FIGS. 2 and 2a, there was manufactured a tire cord fabric A having the following dimensions:

| | |
|---|---|
| Warp cord 1 | : nylon cord of 1890 d/2 |
| Warp density of warp cords 1 | : 50 cords/5 cm |
| Width of selvage portion 4 | : 5 mm |
| Warp cord 1' | : nylon cord of 840 d/2 |
| Warp density of warp cords 1' | : 50 cords/5 cm |
| Cord diameter g of warp cord 1 | : 0.76 mm |
| Cord diameter $g_1$ of warp cord 1' | : 0.51 mm |
| Ratio of cord diameter $g_1$ to cord diameter g | : 67% |
| Overlap distance $w_2$ in joint part J | : 5 mm |

EXAMPLE 2

In accordance with FIGS. 2 and 2b, there was manufactured a tire cord fabric B having the same dimensions as described in Example 1 except that the cord diameter of the warp cord 1' is equal to the cord diameter g of the warp cord 1 and the warp density in the selvage portion 4 is coarser by 2 times that in the remaining central portion.

In order to compare the carcass ply composed of the tire cord fabric A or B with the carcass ply composed of the conventional tire cord fabric, interlaminar separation test of the carcass ply was carried out with respect to the following bias-type pneumatic tire.
Tire size:
  TB 10.00–20 14PR of usual bias construction
Carcass ply:
  6 plies each being composed of cords of cords of 1890 d/2
Breaker:
  3 plies each being composed of cords of 1890 d/2

All of test tires were run on an indoor drum at a speed of 65 km/hr under a normal load of 100% and a normal inflation pressure and thereafter the occurrence of separation was examined. In the test tires, only the structure of the joint part J was different from each other.

| | Conventional tire cord fabric | Tire cord fabric A | Tire cord fabric B |
|---|---|---|---|
| The occurrence of interlaminar separation between the carcass plies after the running of 30,000 km | There was indicated the separation in the warp cords 1 of the joint part J | none | none |

From the above table, it can be seen that the present invention advantageously solves the problem that the joint part between the cut pieces of the tire cord fabric produces a nucleus of causing interlaminar separation between the carcass plies.

Although the present invention has been described with respect to the bias-type pneumatic tire, it will be obvious that the present invention is, of course, applicable to the joint part as the intermediate material such as carcass ply, belt and the like in a radial-type pneumatic tire.

What is claimed is:

1. A tire cord fabric suitable for reinforcement of rubber articles comprising: a plurality of bodies, each body being composed of selvage portions and a remaining central portion and containing therein a great number or cords lengthwisely arranged side by side as warp cords over a given width and then relatively coarsely interlaced with weft yarns, and a joint part formed by overlapping opposite adjoining selvage portions of said bodies with each other; each of said selvage portions being formed by arranging warp cords side by side in a coarse relation; and, in said joint part, the warp cords of said selvage portion of one side being interposed within spaced between warp cords of said selvage portion of the other side to establish a thickness of said joint part substantially equal to that of said central portion.

2. A tire cord fabric as claimed in claim 1, wherein the space between the warp cords in each of said selvage portions is at least equal to the cord diameter of said warp cords in said central portion.

3. A tire cord fabric as claimed in claim 2, wherein the warp cords in each of said selvage portions have the same cord diameter as used in said central portion.

* * * * *